Nov. 14, 1967 J. T. CHERRY, JR., ET AL 3,353,011
METHOD AND APPARATUS FOR CORRELATING
TWO RECORDED SIGNALS
Filed April 17, 1963 2 Sheets-Sheet 1

INVENTORS
JESSE T. CHERRY, JR. &
GRAYDON L. BROWN
BY
ATTORNEY

Nov. 14, 1967  J. T. CHERRY, JR., ET AL  3,353,011
METHOD AND APPARATUS FOR CORRELATING
TWO RECORDED SIGNALS
Filed April 17, 1963  2 Sheets-Sheet 2

INVENTORS
JESSE T. CHERRY, JR &
GRAYDON L. BROWN
BY

ATTORNEY

United States Patent Office 3,353,011
Patented Nov. 14, 1967

3,353,011
METHOD AND APPARATUS FOR CORRELATING TWO RECORDED SIGNALS
Jesse T. Cherry, Jr., and Graydon L. Brown, Ponca City, Okla., assignors to Continental Oil Company, Ponca City, Okla., a corporation of Delaware
Filed Apr. 17, 1963, Ser. No. 273,634
4 Claims. (Cl. 235—181)

This invention relates to improvements in the art of signal analysis and more particularly, but not by way of limitation, relates to a novel method and apparatus for determining the degree of coherence between two signals represented by two elongated force fields.

In geophysical prospecting, a seismic signal is generated at or near the surface of the earth and propagates as a wave front downwardly and in all directions from the point of generation. A portion of the seismic signal travels primarily in the surface layers of the earth and arrives in a relatively short time at a nest of geophones placed on the surface of the earth at a distant point. The seismic signal also propagates downwardly and as it passes through various surfaces of discontinuity or interfaces, a portion of the seismic energy is reflected back to the earth and is recorded by the geophones at a later time, dependent upon the length of the path followed by the particular portion of the seismic energy. The period of time required for the seismic energy to travel downwardly and be reflected back to the surface provides information concerning the depth and position of the interfaces between the sedimentary strata of the earth which is very useful in the location of mineral deposits such as petroleum.

For many years the seismic signals were generated by an explosive blast and therefore had a substantially instantaneous high peak energy content attended by a large amount of random noise. However, in more recent times, improved methods of seismic surveying have been developed which utilize a seismic signal of considerably lower energy level, but having a controlled frequency content and a relatively long time duration. An example of the latter type of seismic signal and the method of seismographic surveying using the signal are described in their various aspects in U.S. Patents No. 2,688,124, No. 2,808,577, No. 2,981,928 and No. 2,989,726, each of which is assigned to the assignee of the present invention. The seismic signal used in this method is conveniently generated by a hydraulically powered transducer and persists for several seconds, during which period of time the signal varies between a low frequency of approximately 10 c.p.s. and a high frequency as great as 100 c.p.s. The frequency content of a seismic signal is precisely controlled by appropriate phase control circuitry which governs the operation of the mechanical transducer. Customarily, the frequency of the seismic signal changes uniformly with respect to time either from the low frequency to the high frequency, which is referred to by workers in the art as an "upsweep," or from the high frequency to the low frequency, which is referred to as a "downsweep." Of course it will be appreciated that substantially any long duration signal having a varying, but controlled frequency content, can be utilized.

When the long duration sweep signal is induced in the earth so as to propagate downwardly through the various subsurface interfaces, a portion of the energy of the entire sweep signal will be reflected at each subsurface interface. Since the total time required for the signal to return to the surface, even from the deeper interfaces, is normally less than the several seconds duration of the sweep signal, the reflected sweep signals which have travelled over the various paths will not be completely separated in time, but rather will overlap such that a very complex signal will be detected by the suitably located geophones, and recorded. The present invention is particularly well suited for determining the precise arrival time at the geophones of each reflected sweep signal, although it is to be understood that the method and apparatus of this invention can be used to determine the degree of coherence between any two signals and therefore will be useful in other areas of endeavor.

As described in copending U.S. patent application Ser. No. 812,289, filed by Doty et al. on May 11, 1959, and assigned to the assignee of the present invention, the time required for the seismic sweep signal to travel to each interface and be reflected to the surface can be accurately determined merely by finding the time at which a replica of the sweep signal has maximum coherence with the complex signal recorded by the geophones. In the referenced application Ser. No. 812,289, the time-phase coherence problem was solved by optical means which entailed recording the complex signal on a transparent film strip as an opaque trace. In addition to the expense of the equipment and the film, the photographic step required considerable time and inconvenience.

The present invention is concerned with a method and apparatus for solving the time-phase coherence problem, which is known in the art as correlation, by electrically producing elongated force fields representative of the finite time periods of the complex recorded signal and the sweep signal, positioning the force fields in interacting relationship, and measuring the resultant force as a representation of the degree of coherence between the time periods of the two signals. Without intending to limit the invention as defined by the appended claims, one representative method in accordance with the present invention may be summarily described as electrically recording the signals on separate tapes, either magnetically, electrostatically, or by some equivalent method to produce the necessary force fields, positioning the tapes in close, parallel relationship so that the force fields interact, and measuring the force between the two tapes to determine the degree of coherence between the two signals. Then by moving one of the tapes longitudinally relative to the other and continuously measuring the resulting force, a correlation with respect to time can be attained. In most cases it will be desired to record the force measurement as a visible time trace on a suitable elongated record moved in synchronism with movement of the tape. Then if the tape upon which the sweep signal is recorded is held stationary and the tape upon which the complex seismic signal is recorded is moved, the visible time trace will provide the desired information relating to the time required for the sweep signal to travel downwardly to the various reflecting interfaces and return to the recording geophones.

Therefore it is an important object of the present invention to provide a method and apparatus for determining the degree of coherence between two signals.

Another object of the present invention is to provide a novel method and apparatus for correlating two signals electrically recorded on two elongated tapes.

Still another object of the present invention is to provide a method and apparatus for correlating information magnetically recorded on two elongated magnetic tapes.

Yet another object of the present invention is to provide a method and apparatus for solving the time-phase coherence problem in seismographic surveying.

A still further object of the present invention is to provide a method and apparatus for rapidly and economically determining the degree of coherence between any two signals.

Another object of the present invention is to provide a method and apparatus for determining the degree of coherence between two signals represented by two elongated electrostatic force fields.

Still another object of the present invention is to provide a novel apparatus for correlating the information recorded on two magnetic tapes, which apparatus may be economically manufactured and which has a long service life.

Many additional objects and advantages of the present invention will be evident to those skilled in the art from the following detailed description and drawings, wherein.

Figure 1:
FIG. 1 is a schematic representation of a conventional magnetic tape having a sinusoidal signal impressed thereon.

Referring now to the drawings, and in particular to FIG. 1, a longitudinal section of a conventional magnetic tape is designated by the reference numeral 10. The magnetic tape 10 may have a conventional plastic base 11 which is coated on at least one side by a magnetizable material such as a metallic oxide, and which is designated generally by the reference numeral 12. When the material 12 is magnetized by conventional magnetic recording means, the magnetic material will be rearranged in such a manner that it can be simulated, for convenience of discussion, by a plurality of elongated bar magnets each having north and south magnetic pole and each oriented longitudinally of the tape substantially as illustrated. Both the polar orientation and magnetic strength of the elementary bar magnet 14 will vary in accordance with the magnitude and frequency of the signal recorded on the tape 10 and the collection of magnets will produce an elongated magnetic force field at the surface of the tape which will also vary in strength and polarity in the same manner and will of course also be representative of the recorded signal.

Figure 2:
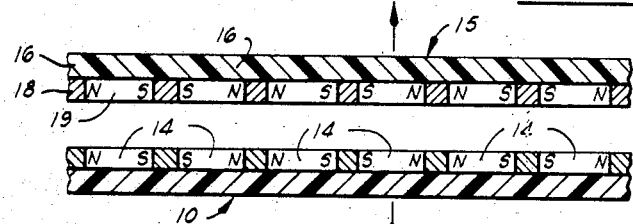
FIG. 2 is a schematic representation of the magnetic tape of FIG. 1 disposed adjacent another magnetic tape also having a sinusoidal signal impressed thereon.

A second magnetic tape 15 of substantially the same construction as the tape 10 is comprised of a base 16 and a coat of magnetizable material 18. If a second signal is recorded on the second tape 15 by conventional recording techniques, the coat of magnetic material 18 may also be represented by a plurality of longitudinally oriented bar magnets 19 which will produce a magnetic force field at the surface of the tape 15 which will be representative of the signal recorded on the magnetic tape 15. Then if the second magnetic tape 15 is positioned in parallel relationship to the tape 10, substantially as illustrated in FIG. 2, the magnetic force fields will interact and a force of repulsion or attraction will occur between the two tapes, depending upon the relative orientation of the magnetic force fields impressed on the tapes as represented by the bar magnets 14 and 19.

Figure 3:
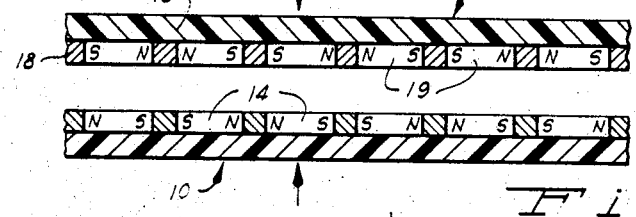
FIG. 3 is a schematic representation of the two magnetic tapes of FIG. 2, with one of the tapes shifted 180 degrees.

Assume that the signals recorded on the tapes 10 and 15 are both sinusoidal and of the same frequency and amplitude. The magnetic force field would then alternate at a uniform rate between north to south poles, substantially as illustrated in FIGS. 1 and 2. Then when the magnetic force fields are positioned so that the north poles on the tape 10 are positioned opposite the north poles on the tape 15 and the south poles on the tape 10 are positioned opposite the south poles on the tape 15, substantially as shown in FIG. 2, it will be evident that a maximum force of repulsion will occur. In this condition it will be noted that the signals on the tapes are exactly in phase. On the other hand, if the magnetic tape 15 is shifted until the signal recorded thereon is 180 degrees out-of-phase with the signal on the tape 10, as illustrated in FIG. 3, the north poles of the bar magnets 19 will be aligned with the south poles of the magnets 14 and the south poles of the magnets 19 aligned with the north poles of the magnets 14, and a maximum force of attraction will occur. Of course it will be appreciated that at intermediate points between the positions shown in FIGS. 2 and 3, the force existing between the tapes 10 and 15 will vary sinusoidally from maximum repulsion when the tapes are in the positions of FIG. 2, to maximum attraction when the tapes are in the positions shown in FIG. 3. It will further be appreciated that in the event the signal impressed upon the tape 15 differs from the signal upon the tape 10 in frequency and magnitude, the total force between a given length of the tapes which are positioned in parallel relationship so that the force fields interact will be a direct measure of the degree of coherence between the two signals. Thus it will be seen that the force between the tapes 10 and 15 resulting from the interaction of the force fields of the two tapes represents the summation of a plurality of discreet forces of repulsion or attraction acting over a finite or predetermined longitudinal section of the tape and the resultant force may be considered as a measure of the integral of the algebraic sum of the aligned instantaneous values of the two signals.

Figure 5:
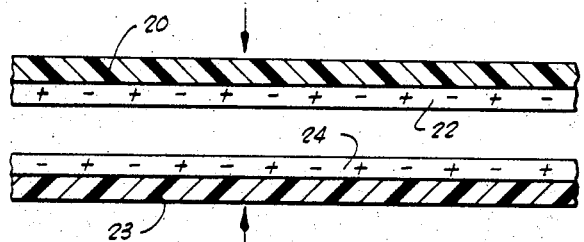
FIG. 5 is a schematic representation of two electrostatic tapes and serves to illustrate still another aspect of the present invention.

In view of the present state of the art, magnetic tapes are probably the most practical means for practicing the method of the present invention. However, the method of the present invention can also be practiced by utilizing a tape 20 upon which electrostatic charges 22 are impressed by suitable recording means to establish an electrostatic force field representative of a signal which is to be correlated with the signal magnetically impressed on the magnetic tape 10, for example. The electrostatic force field impressed on the tape 20 will then interact with the magnetic force field of the magnets 14 on the tape 10 to produce a resultant force between the two tapes, either of attraction or repulsion, in substantially the same manner as described above. Similarly, the present invention can be practiced by utilizing two electrostatic force fields as illustrated in FIG. 5 where the electrostatic tape 20 is disposed in parallel, spaced relationship to a similar electrostatic tape 23 having electrostatic charges 24 imposed thereon in accordance with a signal which is to be analyzed. The force, either of attraction or repulsion, resulting from the interaction of the two electrostatic force fields will again be a measure of the degree of coherence between the two finite time periods of the signal represented by the interacting force fields. It will also be appreciated that if the tapes 20 and 23 are moved longitudinally with respect to each other, the resulting force between the two tapes at any point of travel will be indicative of the degree of coherence between those two portions of the signal and that by recording the magnitude and polarity of the force in synchronism with the relative movement of the tapes, a correlation between the two signals with respect to substantially any desired time-phase relationship can be attained.

Figure 6:
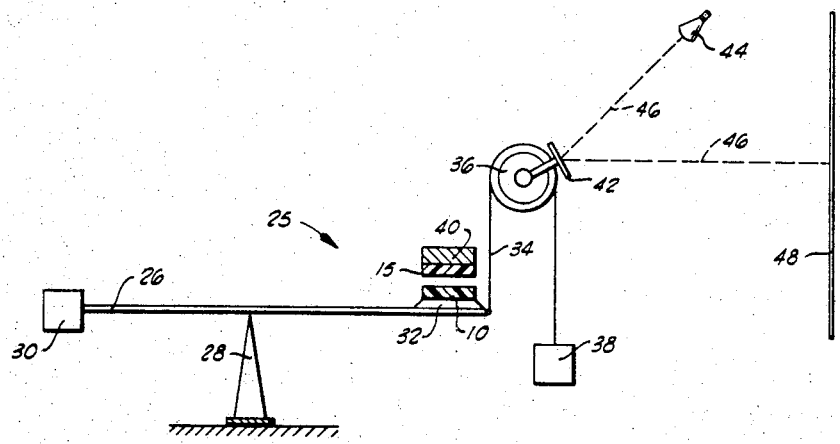
FIG. 6 is a schematic drawing illustrating one embodiment of the present invention.

Referring now to FIG. 6, a novel device for practicing the novel method of the present invention is indicated generally by the reference numeral 25. The device 25 is comprised of a beam 26 which is balanced on a knife edge or fulcrum 28. A counterweight 30 is connected to one end of the beam 26 and a holder 32 for a length of magnetic tape is connected to the other end. The beam 26 is held in balance by a second counterweight 38 which is connected to a flexible member 34, such as a thread, which in turn passes around a sheave 36 and is connected to the end of the beam 26. The weight 38 counteracts the tendency the beam 26 would otherwise have to rotate in the counterclockwise direction, and positions the tape holder 32 on the end of the beam in spaced relationship to a second tape holder 40. The two tapes carrying the two signals to be correlated are positioned in the holders 32 and 40. For example, the tape 10 may be placed on the holder 32 and the tape 15 may then be carried by the holder 40. The tapes 10 and 15 are preferably disposed transversely of the balance beam 26 so that all points along the length of the tapes will have equal moment arms about the fulcrum 28. Therefore it will be appreciated that the tapes 10 and 15 are shown in transverse cross section in FIG. 6. The tape holder 40 includes a suitable means for moving the magnetic tape 15 longitudinally past the tape 10 with the force fields of the two tapes continuously interacting for purposes which will hereafter become more evident.

A suitable mirror 42 is connected to rotate with the sheave 36. A light source 44 directs a thin beam of light 46 onto the mirror 42 which reflects the beam of light onto a suitable recording media 48 which is also illustrated in transverse cross section. Suitable means (not illustrated) is preferably provided for moving the recording media 48 in timed synchronism with the movement of the magnetic tape 15 so that a continuous record of the degree of coherence between the adjacent time segments of the signals recorded on the magnetic tapes 10 and 15 can be recorded as the tape 15 is moved relative to the tape 10, as will hereafter be described in greater detail.

Figure 7:
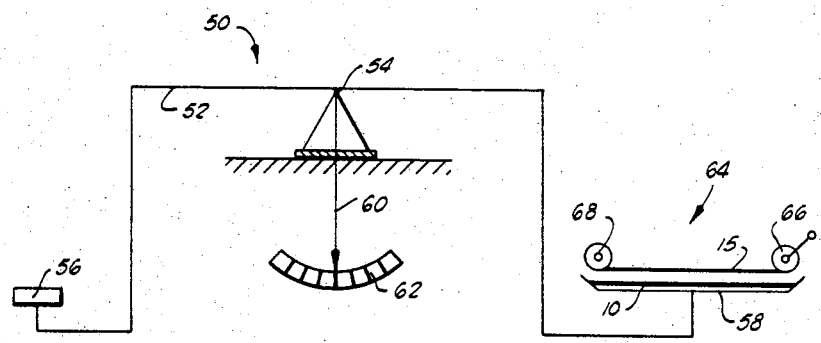
FIG. 7 is a schematic drawing illustrating another embodiment of the present invention.

Referring now to FIG. 7, another device constructed in accordance with the present invention is indicated generally by the reference numeral 50. The device 50 is comprised of a beam 52 which is balanced upon a suitable knife edge or fulcrum 54. A weight 56 is connected to one end of the beam 52 and counterbalances a tape holder means 58 and a predetermined length of magnetic tape, such as the tape 10, which are connected to the other end. A pointer 60 is rigidly connected to the beam 52 and indicates the position of the beam 52 relative to a horizontal or zero position on a suitable scale 62.

Suitable means 64 for moving the magnetic tape 15 in parallel relationship to the length of magnetic tape 10 is schematically represented by a takeup spool 66 and a storage spool 68. As the means 64 moves the magnetic tape 15 longitudinally from the spool 68 to the spool 66, the tape 15 is passed in close parallel relationship to the magnetic tape 10 supported by the holder means 58 so that the force fields impressed on the two tapes will interact as previously described, and the resulting force exerted between the magnetic tapes will be transmitted to and cause an imbalance of the beam 52. The degree of imbalance will be indicated by the pointer 60 on the scale 62 and the imbalance will be a measure of the degree of coherence between the signal recorded on the tape 10 and the signal recorded on that portion of the tape 15 that is in close, parallel relationship to the tape 10. If desired, the indication of imbalance can be recorded on a suitable record media (not illustrated) moved in synchronism with the tape 15 to provide a correlation trace, as will hereafter be described in greater detail.

*Operation*

The novel method of correlating two signals will be more easily understood when described in conjunction with a description of the operation of the device 25 shown in FIG. 6. Further, for convenience of illustration and to facilitate a clearer understanding of the present invention, the practice of the method will be described with respect to the determination of the time-phase coherence between the seismic sweep signal induced in the earth and the complex signal which is subsequently detected by geophones and recorded by suitable means. A duplication of the seismic signal, which it will be recalled will normally be a constant amplitude sweep signal over the frequency spectrum from 10–100 c.p.s., or some portion thereof, is magnetically recorded upon the tape 10 by any conventional magnetic recording means. The magnetizable material 12 will then be magnetized as previously described to produce a series of north and south magnetic poles of substantially the same strength. The poles will alternate between north and south at a rate corresponding to the frequency of the sweep signal, and the magnetic poles will produce a magnetic force field representative of the seismic sweep signal. This signal is then of known frequency content and is sometimes referred to as a reference signal or synchronous signal because it is the signal used to control the hydraulic vibrators or transducers used to induce the seismic signal in the earth.

The signal detected by the geophones and recorded in the field by suitable means is then magnetically recorded on the tape 15. The tape 15 will therefore be magnetized and have a series of north and south poles of such strength as to be representative of the instantaneous sign and amplitude of the complex signal received by the geophones, and the magnetized tape will produce a magnetic force field which will also be representative of the complex signal. The tape 15 is then moved in close, but spaced, parallel relationship past the tape 10 so that magnetic fields of the two tapes will interact. The resulting force acting between the tapes will be representative of the summation of the resultant forces along the entire length of the tape 10. Or, in other words, the resultant force will be a measure of the integral of the algebraic sums of the adjacent instantaneous values of the signals on the two tapes.

Figure 4:
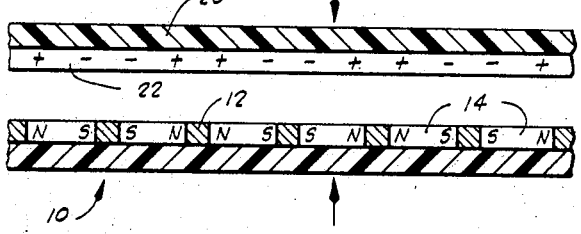
FIG. 4 is a schematic representation of a magnetic tape and an electrostatic tape and serves to illustrate another aspect of the present invention.

The force of attraction or repulsion between the tapes 10 and 15 will deflect the beam 26 from its center position in a direction and amount proportional to the direction and magnitude of the resulting force and the weight 38 will be accordingly raised or lowered, the sheave 36 will rotate and the beam of light 46 will be moved transversely across the recording media 48 to record, such as by a photographic process, the force acting between the tapes 10 and 15. In this regard, it will be noted that the beam of light 46 should be oriented at the center of the recording media 48 when no force exists between the tapes 10 and 15. When the resulting force between the tapes 10 and 15 is one of attraction, the light beam 46 will be reflected downwardly from the central axis when referring to FIG. 6. The downward deflection will reach a maximum when the signal upon the tape 15 is substantially identical to the reference signal impressed on the tape 10 but is 180 degrees out-of-phase, as illustrated in FIG. 3. Then when the signals on the tapes 10 and 15 move into a position representative of phase alignment, as schematically illustrated in FIG. 2, the resulting force of repulsion between the tapes will cause the beam of light 46 to be deflected upwardly. The upward deflection will reach a maximum when the two signals are precisely in phase. Therefore it will be appreciated that as the tape 15 is moved relative to the tape 10, each time that a reflection of the reference signal or sweep signal which was induced in the earth occurs in the complex signal recorded on the tape 15, the beam of light 46 will first be deflected downwardly as the two segments pass 180 degrees out-of-phase, will then be deflected upwardly to a maximum point when the two signals are precisely in phase, and then will again be deflected downwardly as the two signals once again pass 180 degrees out-of-phase. This will occur each time that the reference signal on the tape 10 substantially coincides with the portion of the complex signal on the tape 15 which is positioned adjacent thereto at that particular moment, and the sweep signal will occur in the complex signal each time that a reflection of the seismic sweep signal arrives at the detecting geophones. Thus if the recording media 48 is moved in synchronism with the tape 15, the light beam 46 will trace a path on the recording media 48 which will be a continuous indication of the degree of coherence between the signals on the tapes 10 and 15, and more importantly, will indicate at each maximum value a point in time at which a sweep signal reflection was received from a subterranean interface by the geophones. Of course, it will be appreciated that two electrostatic tapes, such as the tapes 20 and 23 illustrated in FIG. 5 for example, may be used in place of the magnetic tapes 10 and 15 in the device 25, or a single electrostatic tape and a magnetic tape may be utilized as illustrated in FIG. 4.

The operation of the apparatus 50 of FIG. 7 is substantially identical to the operation of the device 25 described above. The reference sweep signal may be recorded on the length of magnetic tape 10 carried by the holder means 58 and the complex, unknown seismic record signal recorded on the magnetic tape 15. Then as the tape 15 is moved longitudinally of the tape 10 in spaced, parallel relationship thereto, the force fields of the two tapes will interact and a resulting force will be exerted upon the tape 10 to cause an imbalance in the beam 52. The degree of imbalance will be indicated by the pointer 60 on the scale 62, which will provide a visual indication of the instantaneous degree of coherence between the signal recorded on the stationary length of tape 10 and that finite time length of the signal recorded on the portion of the tape 15 which is at that instant adjacent to the tape 10. It will also be appreciated that a suitable recording means may be connected to the pointer 60 for scribing a graph upon a chart moving transversely to the indicator scale 62 so as to provide a correlation trace as described above.

Although the method and apparatus of the present invention have been described in connection with the solution of the time-phase problem in the seismographic surveying method referred to above, it will be appreciated by those skilled in the art that the method and apparatus can be utilized to determine the degree of coherence between any two signal, either known or unknown. It will also be evident that any means for producing the force fields is within the broad purview of the present invention.

From the foregoing, it will be apparent that the present invention provides a novel method and apparatus for correlating two unknown signals. Since the only force relating to this correlation is the force of attraction or repulsion between the two recording media, such as magnetic tape, a correlation record may be produced which is free from extraneous noise or other sources of inaccuracy. It will also be apparent that this novel method provides a very sensitive means of correlating information carried by two tapes which can be either magnetic or electrostatically sensitive. Also, this novel method of correlation may be economically practiced with considerable accuracy and precision. Finally, it will be apparent that the present invention provides apparatus for practicing the novel method which is simple in construction, may be easily manufactured and which has a long service life.

Changes may be made in the combination and arrangements of parts or elements as heretofore set forth in the specification and shown in the drawings without departing from the spirit and scope of the invention as defined by the following claims.

What is claimed is:
1. A method for determining the degree of coherence between a first signal and a second signal recorded as first and second force fields on first and second elongated magnetic tapes, respectively, comprising the steps of:
positioning the first and second elongated magnetic tapes in parallel relationship with the force fields interacting;
moving the first magnetic tape longitudinally relative to the second member and in uniform spaced relationship to the second magnetic tape; and,
measuring the resulting force between the two magnetic tapes as the first magnetic tape is moved relative to the second magnetic tape to provide an indication of the degree of coherence between the first and second signals.

2. A method for determining the degree of coherence between a first signal and a second signal comprising the steps of:
creating a first, elongated force field on a magnetic medium representative of at least a portion of the first signal;
creating a second, elongated force field on a magnetic medium representative of at least a portion of the second signal, positioning said first and second magnetic media in parallel interacting relationship to each other; and,
measuring the resulting force of the two force fields as an indication of the degree of coherence between the corresponding portions of the two signals.

3. A method for determining the degree of coherence between a first signal and a second signal comprising the steps of:
recording the first signal on a first magnetic tape to produce a first magnetic force field representative of the first signal;
recording the second signal on a second magnetic tape to produce a second magnetic force field representative of the second signal;
moving the first magnetic tape relative to the second magnetic tape with the first and second magnetic force fields interacting; and,
measuring the resulting magnetic force between the first and second magnetic tapes as an indication of the degree of coherence between the first and second signals.

4. A method for correlating an unknown signal recorded on a first magnetic tape with a known signal recorded on a second magnetic tape of shorter length comprising the steps of:
positioning the first magnetic tape carrying the unknown signal in a spaced, parallel relationship with the second tape;
moving the first tape relative to the second tape; and,
measuring the magnetic force between the two tapes, said measurement indicating the degree of correlation between the unknown signal and the known signal.

References Cited
UNITED STATES PATENTS

| | | | |
|---|---|---|---|
| 2,509,780 | 5/1950 | O'Dea | 179—100.2 |
| 2,957,627 | 10/1960 | Roper et al. | 235—194 |
| 3,110,801 | 11/1963 | Katzenstein et al. | 235—194 |

MALCOLM A. MORRISON, *Primary Examiner.*

A. J. SARLI, *Assistant Examiner.*